United States Patent
Viswanathan Pillai et al.

(10) Patent No.: US 12,475,035 B2
(45) Date of Patent: Nov. 18, 2025

(54) METHODS AND APPARATUS TO FACILITATE IMMUTABLE CONFIGURATION OF MEMORY DEVICES

(71) Applicant: Texas Instruments Incorporated, Dallas, TX (US)

(72) Inventors: Prasanth Viswanathan Pillai, Bangalore (IN); Rajasekhar Reddy Allu, Plano, TX (US); David P. Foley, Sugar Land, TX (US); Amritpal S. Mundra, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/429,064

(22) Filed: Jan. 31, 2024

(65) Prior Publication Data
US 2025/0053507 A1   Feb. 13, 2025

Related U.S. Application Data

(60) Provisional application No. 63/532,099, filed on Aug. 11, 2023.

(51) Int. Cl.
*G06F 12/02* (2006.01)

(52) U.S. Cl.
CPC ................. *G06F 12/0246* (2013.01)

(58) Field of Classification Search
CPC .. G06F 12/0246; G06F 12/0646; G06F 3/062; G06F 3/0623; G06F 3/0629; G06F 3/0679
See application file for complete search history.

(56) References Cited

U.S. PATENT DOCUMENTS

| 2003/0227804 | A1* | 12/2003 | Lofgren | G11C 8/12 |
| | | | | 365/200 |
| 2009/0210644 | A1* | 8/2009 | Batifoulier | G06F 12/1441 |
| | | | | 711/E12.091 |
| 2017/0285975 | A1* | 10/2017 | Trika | G06F 3/0659 |
| 2017/0285987 | A1* | 10/2017 | Brannock | G06F 3/067 |
| 2018/0004418 | A1* | 1/2018 | Shanbhogue | G06F 3/0673 |
| 2020/0089894 | A1* | 3/2020 | Liu | G06F 3/0679 |
| 2021/0263746 | A1* | 8/2021 | Thom | G06F 3/0685 |
| 2023/0385420 | A1* | 11/2023 | Berthelot | G06F 21/52 |

OTHER PUBLICATIONS

Shen, Zhuojia, Komail Dharsee, and John Criswell. "Fast execute-only memory for embedded systems." In 2020 IEEE Secure Development (SecDev), pp. 7-14. IEEE, 2020.*

(Continued)

*Primary Examiner* — Tracy A Warren
(74) *Attorney, Agent, or Firm* — Michael T. Gabrik; Frank D. Cimino

(57) ABSTRACT

Methods, apparatus, systems, and articles of manufacture are described corresponding to immutable configuration of memory devices. An example memory includes a memory bank including a first portion and a second portion, the second portion configured to store configuration information that specifies whether the first portion is immutable; and a controller coupled to the memory bank, the controller configured to determine whether to prevent data from being written to the first portion based on the configuration information.

20 Claims, 5 Drawing Sheets

(56) References Cited

OTHER PUBLICATIONS

Kwon, Donghyun, Jangseop Shin, Giyeol Kim, Byoungyoung Lee, Yeongpil Cho, and Yunheung Paek. "{uXOM}: Efficient {execute-Only} Memory on {ARM}-{Cortex-M}." In 28th USENIX Security Symposium (USENIX Security 19), pp. 231-247. 2019.*
Schink, Marc, and Johannes Obermaier. "Taking a look into {Execute-Only} memory." In 13th USENIX Workshop on Offensive Technologies (WOOT 19). 2019.*
Jin, Hai, Benxi Liu, Yajuan Du, and Deqing Zou. "BoundShield: comprehensive mitigation for memory disclosure attacks via secret region isolation." IEEE Access 6 (2018): 36341-36353.*

* cited by examiner

METHODS AND APPARATUS TO FACILITATE IMMUTABLE CONFIGURATION OF MEMORY DEVICES

RELATED APPLICATIONS

This application claims priority to U.S. Provisional Patent Application No. 63/532,099, filed Aug. 11, 2023, which is incorporated herein by reference in its entirety.

TECHNICAL FIELD

This description relates generally to circuits, and, more particularly, to methods and apparatus to facilitate immutable configuration of memory devices.

BACKGROUND

Devices including electronics are produced by a manufacturer and may be integrated into intermediate and/or final products by one or more vendors. Such devices may include processing circuitry, memory, etc. Memory may include both volatile and non-volatile memory. Non-volatile memory, such as flash memory, is memory that retains stored values even after power is removed from the device. Such non-volatile memory may store user-writeable data and data that should not be writeable by the user such as cryptographic key data or manufacturer/vendor/user/user proprietary code.

SUMMARY

An example of the description includes a method which includes memory comprising a memory bank including a first portion and a second portion, the second portion configured to store configuration information identifying the first portion as immutable; and a controller coupled to the memory bank, the controller to, after initialization, prevent data from being written to the first portion based on the configuration information.

An example apparatus comprises memory circuitry including a first portion of memory and a second portion, the second portion configured to store configuration information identifying the first portion as immutable; processing circuitry to: obtain the configuration information from the memory circuit; store the configuration information in a register; and after obtaining an identification of an operation to the first portion of the memory, send a message to prevent the operation to the first portion of the memory.

An example apparatus comprises memory circuitry including a first portion of memory and a second portion, the second portion configured to store configuration information identifying the first portion as immutable; a memory controller to at least one of instantiate or execute computer readable instructions to: after obtaining instructions corresponding to a write operation to write data to a location of the memory circuit, output an alert including the location of the memory circuit; and after obtaining a response to the alert, prevent the write operation to the location of the memory circuit.

BRIEF DESCRIPTION OF THE DRAWINGS

The same reference numbers or other reference designators are used in the drawings to designate the same or similar (functionally or structurally) features.

DETAILED DESCRIPTION

Figure 1:
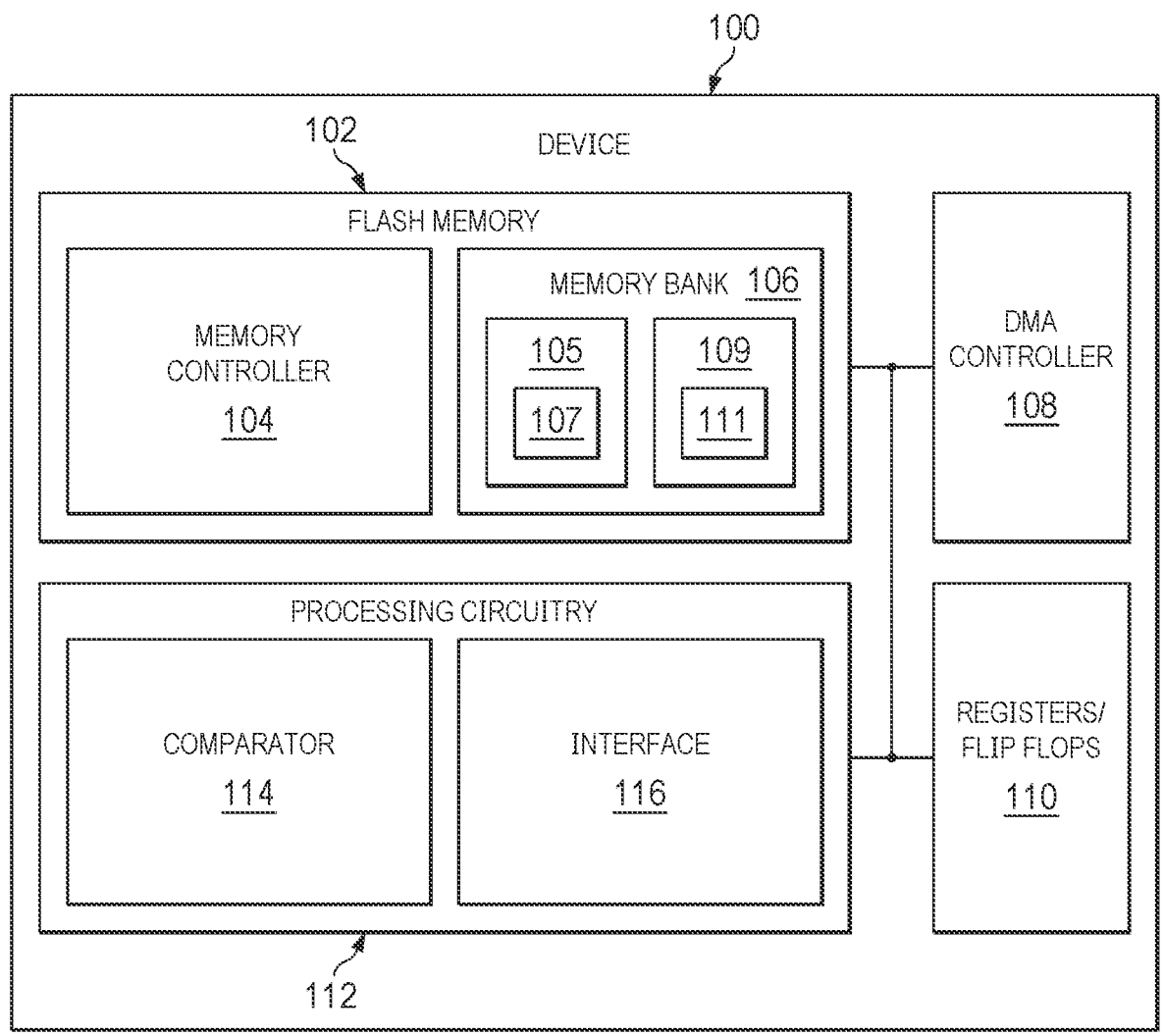
FIG. 1 is a block diagram of an example of a device including flash memory.

The drawings are not necessarily to scale. Generally, the same reference numbers in the drawing(s) and this description refer to the same or like parts. Although the drawings show regions with clean lines and boundaries, some or all of these lines or boundaries may be idealized. In reality, the boundaries or lines may be unobservable, blended or irregular.

A computing device is any device that includes processing circuitry to perform one or more operations. Most computing devices include non-volatile memory. Non-volatile memory is memory that retains stored values even after power is removed from the device. Non-volatile memory includes flash memory, ferroelectric random-access memory (FeRAM), magnetic random-access memory (MRAM), phase-change memory (PCM), resistive random-access memory (RRAM), etc. During a booting process of a computing device, the computing device may execute code stored on a BootROM, which may include copying the code from the BootRom into a non-volatile, rewritable memory (e.g., flash). However, by default, the code in the non-volatile, rewritable memory can be written over or changed.

Some manufacturers, vendors, or users may want to define a region (e.g., a section, a portion, etc.) of the non-volatile, rewritable memory as immutable (e.g., a region of memory that cannot changed, erased, updated, or written to after initialization). For example, immutable code (e.g., code stored in an immutable region of memory) can be used to recover from a firmware upgrade failure. A fault during a firmware upgrade can render a device into an irrecoverable stage. However, immutable code in the non-volatile memory can be used for recovery by instantiating a computing device to perform a full erase of the non-immutable sectors of the memory. Also, or alternatively, the portion of the non-volatile, rewritable memory that is reserved for immutable code may be used for key (e.g., cryptographic key) storage.

Examples described herein allow a manufacturer/vendor/user/user to define a section of non-volatile, rewritable memory as immutable and facilitate the operation of the memory to preserve the immutable section of the memory. Non-volatile, rewritable memory may include various regions such as a key region and a data region. They key region may be write-once by design (e.g., may include supporting circuitry to write data by changing a 1 to a 0 while lacking circuitry to erase data by changing a 0 to a 1) while the data region may be re-writable (e.g., may include supporting circuitry to write data and erase data). In some examples, the key region can be used to store key data (e.g., cryptographic keys, manufacturer/vendor/user specific keys, etc.) and the data region can be used to store manufacturer/vendor/user code. Examples described herein utilize a section of the key region (e.g., an immutable configuration region) that a manufacturer, vendor, or user can control to define sections of the data region as immutable (e.g., neither writable nor erasable). For example, if the data region is 64 Kilobytes (Kb) of memory, the immutable configuration region may include 32-bit cells, where each bit cell of the immutable configuration region corresponds to a unique 2 Kb region of the 64 Kb data region of the memory. In such an example, the bit cell storing a first value (e.g., '0') configures the corresponding 2 Kb region to be immutable, while a bit cell storing a second value (e.g., '1') configures the corresponding 2 Kb region as non-immutable. Thus, the memory location of any write, erase, or change operations to the data region of the non-volatile memory are first checked against the bit cell values that correspond to the immutable regions of the non-volatile memory. In this manner, writing, erasing, or changing is not permitted to regions flagged as immutable based on the values stored in the bit cells.

Thus, a manufacturer, vendor, or user may store code to a portion of a data region, and then store a value in the key region that causes the portion of the data region to become immutable. After the immutable regions of the non-volatile memory are defined, examples disclosed herein enable or allow read operations to the immutable regions but disable or prevent write operations and erase operations to the immutable regions. For example, after the manufacturer/vendor/user defines the sections of the non-volatile, rewritable memory as immutable by setting the bits of the immutable configuration region, a direct memory access (DMA) controller of the computing device can perform a direct memory access to access the values from the immutable configuration region of the key region of the non-volatile, rewritable memory.

The DMA controller stores the accessed values in a set of flip flops, registers, or any other storage device. The set of flip flops, registers, or any other device stores the accessed values, thereby allowing processing circuitry of the computing device to identify the immutable sections of the non-volatile, rewritable memory. In this manner, after a memory controller of the non-volatile, rewritable memory obtains an instruction to write or erase to a portion of the data region, the memory controller outputs an alert to the processing circuitry. The alert identifies the write or erase operation with the corresponding location.

Responsive to the processing circuitry obtaining the alert, the processing circuitry compares the location of the operation identified in the alert to the values stored in the register, flip flops, etc. that identify the immutable regions of the non-volatile, rewritable memory. If the processing circuitry determines that the write or erase operation corresponds to an immutable section, the processing circuitry outputs a signal to the memory controller to prevent the operation. Accordingly, examples described herein provide a structure and operations for facilitating manufacturer/vendor/user-defined immutability of non-volatile, rewritable memory.

FIG. 1 is a block diagram of an example device 100 to facilitate an immutable configuration of a memory device. The example described in FIG. 1 includes flash memory 102, a memory controller 104, a memory bank 106, a direct memory access (DMA) controller 108, registers/flip flops 110, processing circuitry 112, a comparator 114, and an interface 116. The device 100 may include additional components not shown in FIG. 1.

The device 100 of FIG. 1 may be any device that includes non-volatile memory and processing circuitry. For example, the device 100 may be one or more of: a computer, a cell phone, a tablet, a server, a cloud or edge based device, a television, a video gaming device, an automotive computing device, or any other device that includes, or is otherwise connected to, non-volatile memory and processing circuitry.

The flash memory 102 of FIG. 1 is memory that can store data and maintain the stored data even after power is removed. Although the device 100 includes flash memory 102, examples described herein can be implemented in conjunction with any type of non-volatile, rewritable memory. The flash memory 102 includes the memory controller 104 and the example memory bank 106, which includes memory cells for storing data. The memory bank 106 includes a key region 105 that can be used to store keys and a data region 109 that can be used to store code. During bootup or initialization, the manufacturer, vendor, or user can store key information, code, etc. in the memory bank 106 of the flash memory 102 and define one or more subregions 111 of the data region 109 of the memory bank 106 that are immutable. For example, the manufacturer/vendor/user can instruct the memory controller 104 to write values into an immutable configuration region 107 of the key region 105 of the memory bank 106 that defines which portions of the data region are immutable. An example of memory bank 106 is further described below in conjunction with FIG. 2.

The memory controller 104 of FIG. 1 reads (e.g., obtains, accesses, etc.), writes (e.g., stores, programs, etc.), or erases data into the memory bank 106 based on instructions from the DMA controller 108, processing circuitry 112, or any other device. For example, the bit cells of the memory bank 106 may be initialized to a first value (e.g., '1') and the memory controller 104 can program particular bits (e.g., changing the bit cell from '1' to '0'), erase bit cells (e.g., change from '0' to '1') or read the contents stored in bit cells. The memory controller 104 can store or write values to the immutable configuration region of the memory bank 106 based on manufacturer/vendor/user instructions. After the immutable region is defined, the memory controller 104 cannot reverse the indication (e.g., to change an immutable region to a non-immutable region). However, the memory controller 104 can expand the immutable region to make non-immutable regions into immutable regions after bootup or initialization. Also, after bootup or initialization, the memory controller 104 may obtain instructions to write or erase to a section of the memory bank 106. These instructions may be received from the processing circuitry 112, DMA controller 108, or other suitable element of device 100. In response to such instructions, the memory controller 104 outputs an alert or indication of the operation and the corresponding location to the processing circuitry 112. If the memory controller 104 obtains an indication from the processing circuitry 112 that the operation is prohibited to the location, the memory controller 104 disregards the operation. If the memory controller 104 does not obtain an indication that the operation is prohibited to the location, the memory controller 104 proceeds with the operation. In some examples, the processing circuitry 112 or the memory controller 104 can output an indication that the operation was prohibited to the device that sends the instruction or to a user.

The DMA controller 108 of FIG. 1 may buffer the values in the configuration region 107 in a set of registers/flip flops 110 by performing a direct memory access to access values stored in the configuration region of the memory bank 106 and storing stores the accessed values into the registers/flip flops 110. As described above, the values stored in the immutable configuration region correspond to the manufacturer/vendor/user defined immutable region(s) of the memory bank 106. In some examples, the DMA controller 108 works with a memory controller 104 of the flash memory 102 to access the data from the memory bank 106. For example, in response to a direct memory access instruction from the DMA controller 108, the memory controller 104 can output the data corresponding to the direct memory access instruction.

The register/flip flops 110 of FIG. 1 store the accessed information from the DMA operation. As described above, the DMA operation accesses data related to the sections of the memory bank 106 that the manufacturer/vendor/user defined as immutable. Although the register/flip flops 110 are included in the device 100, the register/flip flops could be replaced with other storage devices.

The processing circuitry 112 of FIG. 1 monitors alerts from the memory controller 104 to determine if the memory controller 104 has output an alert that the memory controller 104 is going to write to or erase to a location in the memory bank 106. The processing circuitry 112 includes the comparator 114 and the interface 116. The processing circuitry 112 uses the comparator 114 to compare the location corresponding to an operation included in an alert from the memory controller 104 to the buffered copy of the values stored in the register/flip flops 110 and/or the copy of the values stored in the configuration region 107. If the comparator 114 determines that the location corresponding to the operation corresponds to an immutable region based on the values of the registers/flip flops 110 and/or configuration region 107, the processing circuitry 112 determines that the operation should be prohibited. For example, if the first value stored in the registers/flip flops 110 and/or configuration region 107 corresponds to the first 2 Kb region of the memory bank 106 and the alert corresponds to the first 2 KB region, the comparator 114 determines whether the first value stored in the register/flip flop 110 and/or configuration region 107 corresponds to a first value indicative of an immutable region or a second value indicative of a non-immutable region. If the comparator 114 determines that the location corresponding to the operation is an immutable location, the processing circuitry 112 outputs (e.g., via the interface 116) an indication to the memory controller 104 to prevent the operation from occurring. If the comparator 114 determines that the location corresponding to the operation is not an immutable location, the processing circuitry 112 outputs an indication to the memory controller 104 to allow the operation or does not output any indication.

The interface 116 of FIG. 1 accesses the values stored in the register/flip flops 110 and/or configuration region 107. As described above, because the values identify the immutable regions of the memory bank 106, the comparator 114 can utilize the values to determine whether an operation corresponds to an immutable location. Also, the interface 116 outputs an indication to the memory controller 104 that an operation should be prohibited if the operation corresponds to an immutable location of the memory bank 106.

In some examples, the interface 116 outputs an indication to the memory controller 104 that an operation should be permitted if the operation corresponds to a non-immutable location of the memory bank 106.

Figure 2:
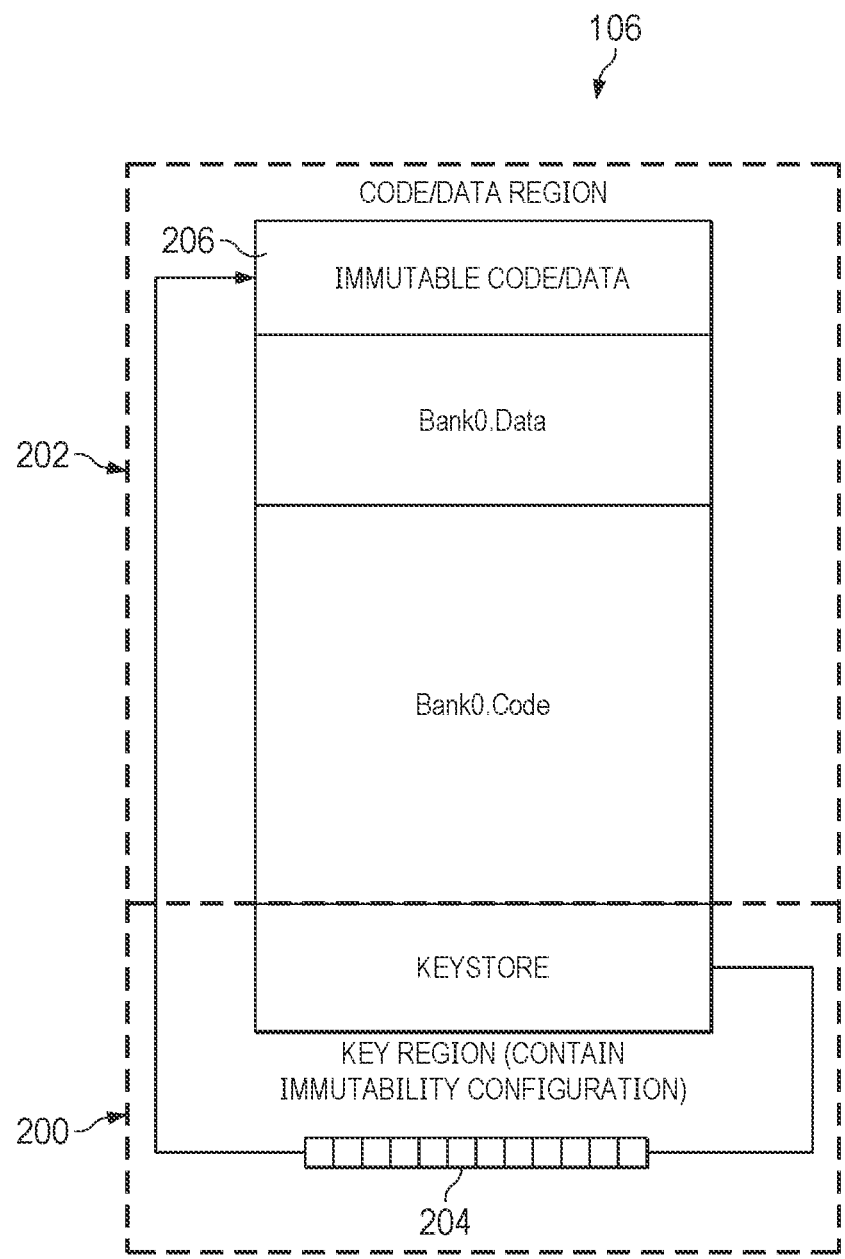
FIG. 2 illustrates an example structure of the flash memory of FIG. 1 that defines an immutable section of the flash memory.

FIG. 2 is an example implementation of the memory bank 106 of the flash memory 102 of FIG. 1. The memory bank 106 includes a keystore region 200 and a data region 202. The keystore region 200 includes the immutable configuration region 204. The data region 202 (also referred to as a code region or a code/data region) includes an immutable code region 206 and a non-immutable code region. In some examples, the keystore region 200 corresponds to the key region 105 of FIG. 1, the immutable configuration region 204 corresponds to the immutable configuration region 107 of FIG. 1, the data region 202 corresponds to the data region 109 of FIG. 1, and the immutable code region 206 corresponds to one or more of the subregions 111 of FIG. 1 that is designated immutable.

The keystore region 200 of FIG. 2 stores key information (e.g., manufacturer/vendor/user-specific cryptographic keys). The manufacturer, vendor, or user can store the key information into the keystore region 200 during boot or initialization of the device 100 or the flash memory 102. The keystore region 200 includes the immutable configuration region 204. As described above, the immutable configuration region 204 stores information that defines portion(s) of the data region 202 that a manufacturer/vendor/user wants to reserve for being immutable sections of the data region 202. In some examples, the memory controller 104 may only change bit values of the immutable configuration region 204 from '1' to '0' and not from '0' to '1.' In such examples, after the manufacturer/vendor/user defines the immutable sections in the code by programming the values into the immutable configuration region 204, a user cannot unmark an immutable section to return to a non-immutable section. In such examples, the user can only expand (e.g., increase) the number of immutable regions (e.g., not shrink the immutable regions) of the memory bank 106. In an example, each bit cell of the immutable configuration region corresponds to a subregion of the data region 202. Thus, the value of the bit cell defines whether the corresponding subregion is immutable or non-immutable.

In the example of FIG. 2, the first portion (e.g., the immutable region 206) of the data region 202 has been selected by a manufacturer, vendor, or user to be immutable. For example, the first bit cell corresponding to the immutable region 206 stores a first value (e.g., '0') that corresponds to immutable. Because, in the example of FIG. 2, the rest of the data region 202 is non-immutable, the values in the immutable configuration region 204 store a second value (e.g., '1') that corresponds to non-immutable.

Figure 3:
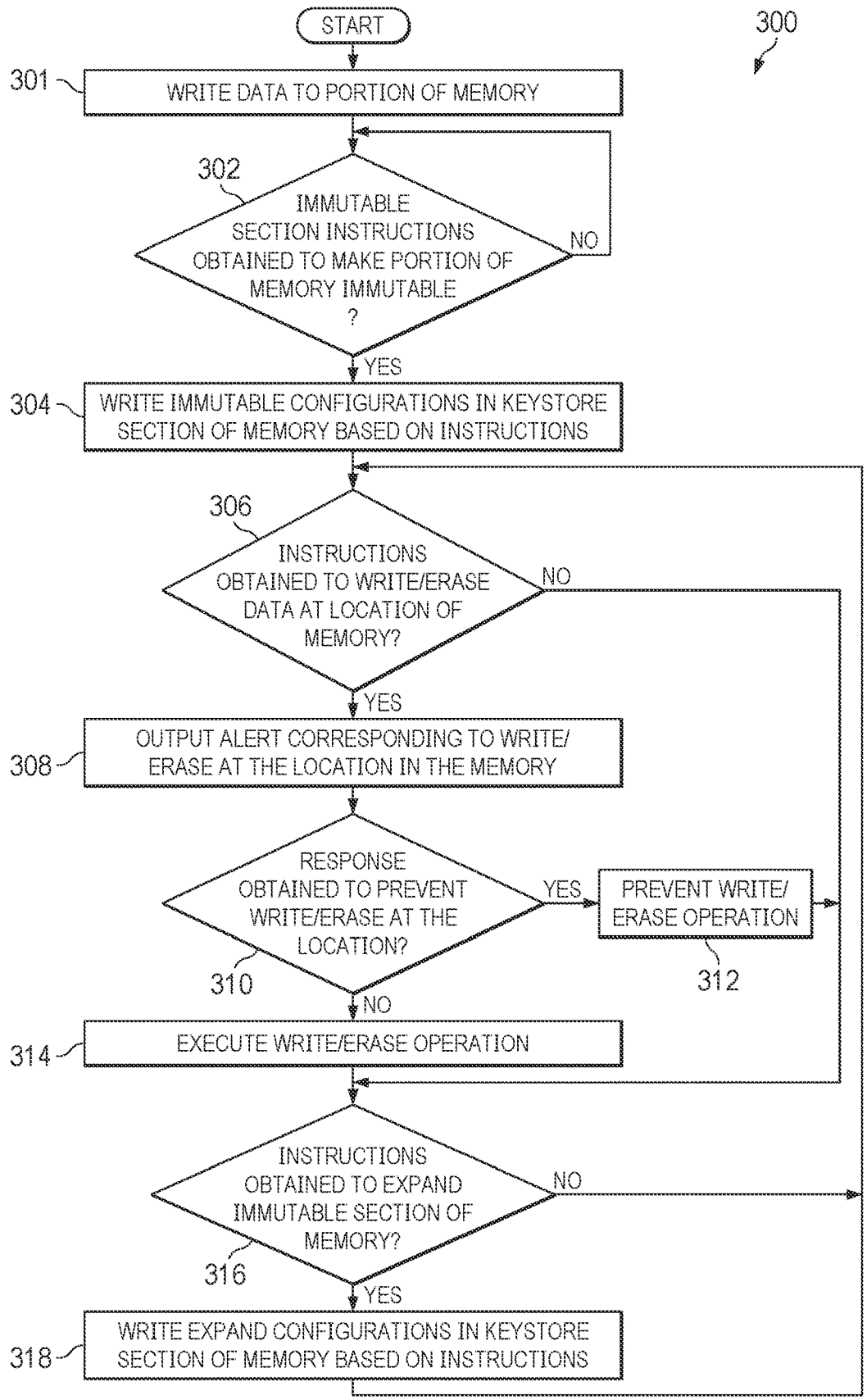
FIG. 3 illustrates a flowchart representative of example machine readable instructions or example operations that may be executed, instantiated, or performed by example programmable circuitry to implement the memory controller of FIG. 1 to facilitate manufacturer/vendor/user/user-defined immutable configuration of non-volatile, rewritable memory devices.

FIG. 3 illustrates a flowchart representative of a method or example operations 300 that may be executed or instantiated by the memory controller 104 of FIG. 1 to facilitate manufacturer/vendor/user-defined immutable configuration of the flash memory 102. The machine-readable instructions or the operations 300 of FIG. 3 begin at block 301, at which the memory controller 104 writes data into a portion of the memory. For example, the memory controller 104 can write data into a portion of the code region 202 of the memory 106.

At block 302, the memory controller 104 determines if immutable section instructions have been obtained to make the portion of the memory immutable. For example, during boot, startup, or initialization, the manufacturer, vendor and/or user can provide immutable section instructions that define which regions of the data region 202 in the memory bank 106 of the flash memory 102 should be immutable.

If the memory controller 104 determines that immutable section instructions have not been obtained (block 302: NO), control returns to block 302 until instructions have been obtained. If the memory controller 104 determines that the immutable section instructions have been obtained (block 302: YES), the memory controller 104 writes or programs the immutable configurations into the immutable configuration portion 204 of the keystore region 200 of the memory bank 106 of the flash memory 102 based on the instructions (block 304). At block 306, the memory controller 104 determines if instructions have been obtained to write or erase data at a location of the data region 202 of the memory bank 106 in the flash memory 102. If the memory controller 104 determines that instructions have not been obtained to write or erase data at a location of the memory bank 106 in the flash memory 102 (block 306: NO), control continues to block 316, as further described below.

If the memory controller 104 determines that instructions have been obtained to write or erase data at a location of the memory bank 106 in the flash memory 102 (block 306: YES), the memory controller 104 outputs an alert, to the processing circuitry 112, corresponding to the write/erase operation at the location in the flash memory 102 (block 308). As described above, the processing circuitry 112 receives the alert and determines whether the location is immutable. Thus, if the location of the write/erase operation is immutable, the processing circuitry 112 will output an indication to prevent the operation. Accordingly, at block 310, the memory controller 104 determines if a response has been obtained to prevent the write or erase at the location. If the memory controller 104 determines that the response to prevent the write/erase operation at the location has been obtained (block 310: YES), the memory controller 104 prevents the write/erase operation at the location of the flash memory 102 (block 312). If the memory controller 104 determines that the response to prevent the write/erase operation at the location has not been obtained (block 310: NO), the memory controller 104 executes the write or erase operation at the location of the flash memory 102 (block 314).

At block 316, the memory controller 104 determines if instructions have been obtained (e.g., from a user) to expand the immutable section of the data region 202 in the memory bank 106 of the flash memory 102. If the memory controller 104 determines that instructions to expand the immutable section have not been obtained (block 316: NO), control returns to block 306. If the memory controller 104 determines that instructions to expand the immutable section have been obtained (block 316: YES), the memory controller 104 writes the expanded configuration information in the immutable configuration region 204 of the keystore region 200 of the memory bank 106 based on the expand instructions (block 318) and control returns to block 306.

Figure 4:
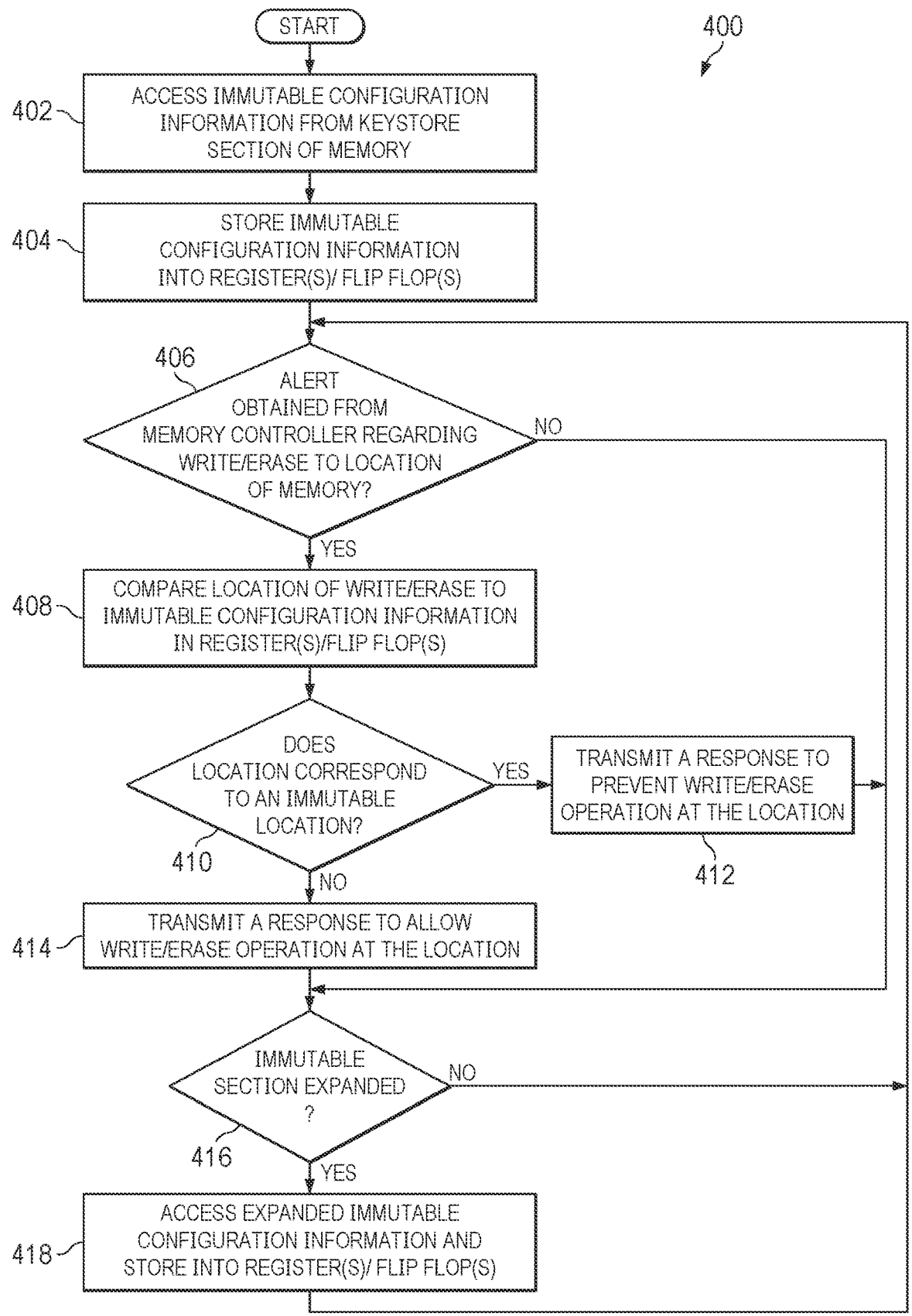
FIG. 4 illustrates a flowchart representative of example machine readable instructions or example operations that may be executed, instantiated, or performed by example programmable circuitry to implement the processing circuitry of FIG. 1 to facilitate manufacturer/vendor/user/user-defined immutable configuration of non-volatile, rewritable memory devices.

FIG. 4 illustrates a flowchart representative of a method or example operations 300 that may be executed or instantiated by the processing circuitry 112 of FIG. 1 to facilitate manufacturer/vendor/user-defined immutable configuration of the flash memory 102. The machine-readable instructions or the operations 400 of FIG. 4 begin at block 402, at which the DMA controller 108 accesses the immutable configuration information from the immutable configuration region 204 of the keystore 200 in the flash memory 102. As described above the immutable configuration information is the values in the bit cells of the immutable configuration region 204 that identifies the subregions of the data region 202 of the memory bank 106 that is/are immutable.

At block 404, the DMA controller 108 stores the immutable configuration information into the registers/flip flops 110 of FIG. 1. At block 406, the processing circuitry 112 determines if an alert has been obtained (via the interface 116) from the memory controller 104 regarding a write or erase operation at a location of the memory bank 106 of the flash memory 102. If the processing circuitry 112 determines that an alert has not been obtained (block 406: NO), control continues to block 416. If the processing circuitry 112 determines that an alert has been obtained (block 406: YES), the comparator 114 compares the location of the write/erase operation from the alert to the immutable configuration information stored in the register(s)/flip flop(s) 110 (block 408). Additionally or in the alternative, the comparator 114 may compare the location of the write/erase operation from the alert to the immutable configuration information stored in the immutable configuration region 204 of the keystore 200 in the flash memory 102.

At block 410, the example comparator 114 determines if the location from the alert corresponds to one of the immutable locations defined by the values in the register(s)/flip flop(s) 110 and/or immutable configuration region 204. If the comparator 114 determines that the location from the alert corresponds to one of the immutable locations (block 410: YES), the processing circuitry 112 transmits a response to the memory controller 104 to prevent the write or erase operation at the location identified in the alert (block 412). If the comparator 114 determines that the location from the alert does not correspond to one of the immutable locations (block 410: NO), the processing circuitry 112 transmits a response to the memory controller 104 to allow the write or erase operation at the location identified in the alert (block 414). In some examples, the processing circuitry 112 may do nothing responsive to the location from the alert not corresponding to one of the immutable locations.

At block 416, the processing circuitry 112 determines whether the immutable section has expanded. For example, the memory controller 104 may output an alert that the immutable portion of the memory bank 106 has expanded. If the processing circuitry 112 determines that the immutable section has not expanded (block 416: NO) control returns to block 406. If the processing circuitry 112 determines that the immutable section has expanded (block 416: YES) the processing circuitry 112 causes the DMA controller 108 to access the expanded immutable configuration information from the immutable configuration region 204 of the keystore 200 and stores the expanded immutable configuration information into the register(s)/flip flop(s) 110 and control returns to block 406.

Figure 5:
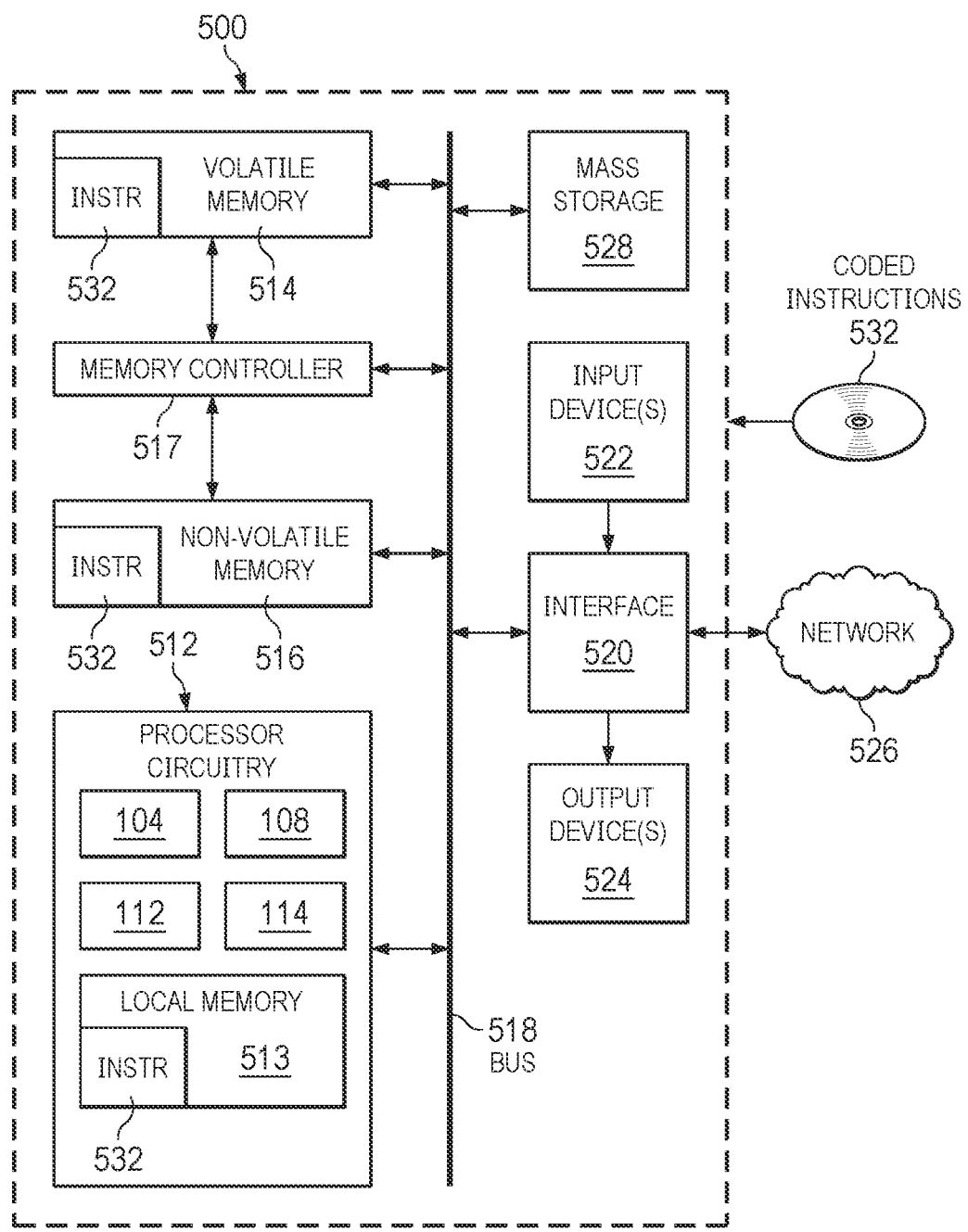
FIG. 5 is a block diagram of an example processing platform including programmable circuitry structured to at least one of execute, instantiate, or perform the example machine readable instructions or perform the example operations of FIGS. 3-4 to implement the processing circuitry or memory controller of FIG. 1.

FIG. 5 is a block diagram of an example programmable circuitry platform 500 structured to execute and/or instantiate the example machine-readable instructions and/or the example operations of FIGS. 3 and/or 4 to implement the device 100 of FIG. 1. The programmable circuitry platform 500 can be, for example, a server, a personal computer, a workstation, a self-learning machine (e.g., a neural network), a mobile device (e.g., a cell phone, a smart phone, a tablet such as an iPad™), an Internet appliance, a DVD player, a CD player, a digital video recorder, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the memory controller 104, the DMA controller 108, and the processing circuitry 112 of FIG. 1.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. In some examples, the non-volatile memory 516 can implement the flash memory 102 of FIG. 1. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in place of any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIGS. 3 and/or 4, may be stored in the mass storage device 528, in the volatile memory 514, in the non-volatile memory 516, and/or on at least one non-transitory computer readable storage medium such as a CD or DVD which may be removable.

An example manner of implementing the device 100 is illustrated in FIG. 1. However, one or more of the elements, processes and/or devices illustrated in FIG. 1 may be combined, divided, re-arranged, omitted, eliminated and/or implemented in any other way.

Further, the memory controller 104, the DMA controller 108, the processing circuitry 112, and/or the comparator 114 may be implemented by hardware, software, firmware and/or any combination of hardware, software and/or firmware. As a result, for example, any of the memory controller 104, the DMA controller 108, the processing circuitry 112, and/or the comparator 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the memory controller 104, the DMA controller 108, the processing circuitry 112, and/or the comparator 114 is/are hereby expressly defined to include a non-transitory computer readable storage device or storage disk such as a memory, a digital versatile disk (DVD), a compact disk (CD), a Blu-ray disk, etc., including the software and/or firmware. Further still, the memory controller 104, the DMA controller 108, the processing circuitry 112, and/or the comparator 114 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

Flowcharts representative of example hardware logic, machine-readable instructions, hardware implemented state machines, and/or any combination thereof for implementing the device 100 of FIG. 1 are shown in FIGS. 3 and 4. The machine-readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware.

Further, although the example program is described with reference to the flowcharts illustrated in FIGS. 3 and 4, many other methods of implementing the device 100 may alternatively be used. For example, the order of execution of the blocks may be changed, and/or some of the blocks described may be changed, eliminated, or combined. Also or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, in which the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. As a result, the described machine-readable instructions and/or corresponding program(s) encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, while the same element may be referred to in a claim with a different descriptor such as "second" or "third." In such instances, such descriptors are used merely for ease of referencing multiple elements or components.

In the description and in the claims, the terms "including" and "having" and variants thereof are to be inclusive in a manner similar to the term "comprising" unless otherwise noted. Unless otherwise stated, "about," "approximately," or "substantially" preceding a value means +/−10 percent of the stated value. In another example, "about," "approximately," or "substantially" preceding a value means +/−5 percent of the stated value. IN another example, "about," "approximately," or "substantially" preceding a value means +/−1 percent of the stated value.

The terms "couple," "coupled," "couples," and variants thereof, as used herein, may cover connections, communications, or signal paths that enable a functional relationship consistent with this description. For example, if device A generates a signal to control device B to perform an action, if a first example device A is coupled to device B, or if a second example device A is coupled to device B through intervening component C if intervening component C does not substantially alter the functional relationship between device A and device B, such that device B is controlled by device A via the control signal generated by device A. Moreover, the terms "couple," "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIG. 2, components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal," "node," "interconnect," "pad," and "pin" may be used interchangeably.

The term "or" or "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

Example methods, apparatus, systems, and articles of manufacture to facilitate user-defined immutable configuration of non-volatile, rewritable memory devices are described herein. Further examples and combinations thereof include the following: Example 1 includes Memory comprising a memory bank including a first portion and a second portion, the second portion configured to store configuration information that specifies whether the first portion is immutable, and a controller coupled to the memory bank, the controller configured to determine whether to prevent data from being written to the first portion based on the configuration information.

Example 2 includes the memory of example 1, wherein the memory bank is flash memory.

Example 3 includes the memory of example 1, wherein the second portion is within a keystore region of the memory bank.

Example 4 includes the memory of example 1, wherein the first portion is within a data region of the memory bank.

Example 5 includes the memory of example 1, wherein the controller is configured to prevent the data from being written to the first portion by outputting the configuration information to a processor, based on receiving a write operation directed to a location of the memory bank, outputting an alert to the processor including the location, and based on receiving an indication that the location is immutable, preventing the write operation directed to the location of the memory bank.

Example 6 includes the memory of example 1, wherein the second portion includes a plurality of memory cells, wherein each of the memory cells corresponds to a respective location of the memory bank.

Example 7 includes the memory of example 6, wherein each of the memory cells is configured to store a respective value indicating whether the respective location of the memory bank is immutable.

Example 8 includes an apparatus comprising memory including a first portion of memory and a second portion, the second portion configured to store configuration information that specifies whether the first portion is immutable, and processing circuitry configured to obtain the configuration information from the memory, store the configuration information in a register, and based on an operation directed to the first portion of the memory, send a response that specifies whether to prevent the operation to the first portion of the memory based on the configuration information.

Example 9 includes the apparatus of example 8, wherein the memory is non-volatile, rewritable memory.

Example 10 includes the apparatus of example 8, wherein the second portion is within a keystore region of the memory.

Example 11 includes the apparatus of example 8, wherein the first portion is within a data region of the memory.

Example 12 includes the apparatus of example 8, wherein the identification of the operation to the first portion of the memory is included in an alert from the memory, the processing circuitry configured to, based on the alert compare location information included in the alert to the configuration information in the register, and send the response that specifies whether to prevent the operation based on the comparison.

Example 13 includes the apparatus of example 8, wherein the identification is a first identification, the response is a first response, and the operation is a first operation, the processing circuitry configured to, based on a second identification of a second operation to a third portion of the memory different than the first portion, send a second response to allow the operation to the third portion of the memory.

Example 14 includes the apparatus of example 8, wherein the processing circuitry is to, based on an alert that the first portion of the memory has expanded, update the configuration information in the register.

Example 15 includes an apparatus comprising memory including a first portion of memory and a second portion, the second portion configured to store configuration information that specifies whether the first portion is immutable, and a memory controller to at least one of instantiate or execute computer readable instructions to, based on an instruction corresponding to a write operation to write data to a location of the memory, output an alert including the location of the memory, and based on a response to the alert, determine whether to prevent the write operation to the location of the memory.

Example 16 includes the apparatus of example 15, wherein the response to the alert specifies to prevent the write operation.

Example 17 includes the apparatus of example 15, wherein the memory controller is configured to, based on an indication to expand the first portion of the memory, write expanded configuration information into the second portion of the memory.

Example 18 includes the apparatus of example 15, wherein the memory is non-volatile, rewritable memory.

Example 19 includes the apparatus of example 15, wherein the second portion is within a keystore region of the memory.

Example 20 includes the apparatus of example 15, wherein the first portion is within a data region of the memory.

Modifications are possible in the described examples, and other examples are possible, within the scope of the claims.

What is claimed is:

1. A device comprising:
    a memory bank including a first portion and a second portion, the second portion configured to store configuration information that specifies whether the first portion is immutable;
    a processor coupled to the memory bank; and
    a controller coupled to the memory bank, the controller configured to, based on receiving a write operation directed to a location of the memory bank, output an alert to the processor, the alert including the location, and, based on receiving an indication that the location is immutable, prevent the write operation directed to the location of the memory bank.

2. The device of claim 1, wherein the memory bank is flash memory.

3. The device of claim 1, wherein the second portion is within a keystore region of the memory bank.

4. The device of claim 1, wherein the first portion is within a data region of the memory bank.

5. The device of claim 1, wherein the controller is configured to output the configuration information to the processor, and the processor is configured to determine that the location is immutable based on the configuration information.

6. The device of claim 1, wherein the second portion includes a plurality of memory cells, wherein each of the memory cells corresponds to a respective location of the memory bank.

7. The device of claim 6, wherein each of the memory cells is configured to store a respective value indicating whether the respective location of the memory bank is immutable.

8. An apparatus comprising:
    memory including a first portion of memory and a second portion, the second portion configured to store configuration information that specifies whether the first portion is immutable; and
    processing circuitry configured to:
        obtain the configuration information from the memory;
        store the configuration information in a register; and
        based on an operation directed to the first portion of the memory, receive an alert indicating the operation and a location in the first memory to which the operation is directed, compare the location in the alert to the configuration information in the register, and send a response that specifies whether to prevent the operation to the first portion of the memory based on the configuration information.

9. The apparatus of claim 8, wherein the memory is non-volatile, rewritable memory.

10. The apparatus of claim 8, wherein the second portion is within a keystore region of the memory.

11. The apparatus of claim 8, wherein the first portion is within a data region of the memory.

12. The apparatus of claim 8, wherein the memory is configured to send the alert.

13. The apparatus of claim 8, wherein the identification is a first identification, the response is a first response, and the operation is a first operation, the processing circuitry configured to, based on a second identification of a second operation to a third portion of the memory different than the first portion, send a second response to allow the operation to the third portion of the memory.

14. The apparatus of claim 8, wherein the processing circuitry is to, based on an alert that the first portion of the memory has expanded, update the configuration information in the register.

15. An apparatus comprising:
    memory including a first portion of memory and a second portion, the second portion configured to store configuration information that specifies whether the first portion is immutable; and
    a memory controller to at least one of instantiate or execute computer readable instructions to:
        based on an instruction corresponding to a write operation to write data to a location of the memory, output an alert including the location of the memory; and
        based on a response to the alert, determine whether to prevent the write operation to the location of the memory.

16. The apparatus of claim 15, wherein the response to the alert specifies to prevent the write operation.

17. The apparatus of claim 15, wherein the memory controller is configured to, based on an indication to expand the first portion of the memory, write expanded configuration information into the second portion of the memory.

18. The apparatus of claim 15, wherein the memory is non-volatile, rewritable memory.

19. The apparatus of claim 15, wherein the second portion is within a keystore region of the memory.

20. The apparatus of claim 15, wherein the first portion is within a data region of the memory.

* * * * *